(12) United States Patent
Freeman et al.

(10) Patent No.: US 10,353,533 B2
(45) Date of Patent: Jul. 16, 2019

(54) MANIPULATING VISUAL REPRESENTATIONS OF DATA

(71) Applicant: ADOBE INC., San Jose, CA (US)

(72) Inventors: Bob Freeman, Seattle, WA (US); Paul Sorrick, Seattle, WA (US)

(73) Assignee: ADOBE INC., San Jose, CA (US)

( * ) Notice: Subject to any disclaimer, the term of this patent is extended or adjusted under 35 U.S.C. 154(b) by 143 days.

(21) Appl. No.: 14/974,575

(22) Filed: Dec. 18, 2015

(65) Prior Publication Data

US 2016/0154562 A1 Jun. 2, 2016

Related U.S. Application Data (63) Continuation of application No. 12/167,642, filed on Jul. 3, 2008, now abandoned.

(51) Int. Cl.
*G06F 3/0485* (2013.01)
*G06F 3/0481* (2013.01)
*G06F 3/0484* (2013.01)
*G06F 9/451* (2018.01)

(52) U.S. Cl.
CPC ........ *G06F 3/04812* (2013.01); *G06F 3/0485* (2013.01); *G06F 3/04845* (2013.01); *G06F 9/451* (2018.02); *G05B 2219/31475* (2013.01); *G06F 2203/04806* (2013.01)

(58) Field of Classification Search
CPC .............. G06F 3/04812; G06F 3/0485; G06F 3/04842; G06F 9/4443; G06F 3/04845; G06F 9/4446; G05B 2219/31475
See application file for complete search history.

(56) References Cited

U.S. PATENT DOCUMENTS

| 7,456,993 | B2 | 11/2008 | Walker, Jr. |
| 7,889,212 | B2 | 2/2011 | Schulz et al. |
| 8,185,826 | B2 * | 5/2012 | Farouki ................. G06F 17/241 715/751 |

(Continued)

OTHER PUBLICATIONS

Igarashi, et al, Speed-dependent Automatic Zooming for Browsing Large Documents, Symposium on User Interface Software and Technology, Nov. 6-8, 2000, pp. 139-148.

*Primary Examiner* — Shen Shiau
(74) *Attorney, Agent, or Firm* — Shook, Hardy & Bacon, L.L.P.

(57) ABSTRACT

Technologies relating to manipulating visual representations of data. A method is provided that includes displaying a first visual representation including a zoom parameter having a first value; receiving a first input while maintaining a first position of a cursor relative to the first visual representation; modifying the zoom parameter to have a second value, where the first visual representation of the document is adjusted according to the second value to provide a second visual representation; identifying a change in position of the cursor to a second position relative to the second visual representation; receiving a second input to modify the zoom parameter of the second visual representation; and modifying the zoom parameter to have a third value, where the second visual representation of the document is adjusted relative to the second position of the cursor according to the third value to provide a third visual representation of the document.

17 Claims, 9 Drawing Sheets

(56) References Cited

U.S. PATENT DOCUMENTS

| | | | |
|---|---|---|---|
| 2004/0190011 A1* | 9/2004 | Walker, Jr. | G06F 17/212 358/1.2 |
| 2005/0195157 A1* | 9/2005 | Kramer | G06F 3/04845 345/156 |
| 2005/0195216 A1 | 9/2005 | Kramer et al. | |
| 2005/0198571 A1 | 9/2005 | Kramer et al. | |
| 2005/0210380 A1 | 9/2005 | Kramer et al. | |
| 2006/0111634 A1* | 5/2006 | Wu | A61B 8/00 600/443 |
| 2006/0112350 A1* | 5/2006 | Kato | G06F 3/04845 715/781 |
| 2006/0271281 A1* | 11/2006 | Ahn | G01C 21/26 701/532 |
| 2008/0062202 A1* | 3/2008 | Schulz | G06F 3/0481 345/665 |
| 2008/0148177 A1 | 6/2008 | Lang et al. | |
| 2009/0077465 A1 | 3/2009 | Walker, Jr. | |
| 2009/0221367 A1* | 9/2009 | Longley | G07F 17/3276 463/32 |
| 2010/0287493 A1 | 5/2010 | Majumder et al. | |
| 2011/0115822 A1* | 5/2011 | Bae | G09B 29/106 345/661 |
| 2011/0131544 A1 | 6/2011 | Majumder et al. | |
| 2015/0205499 A1* | 7/2015 | Freeman | G06F 3/04845 715/711 |

* cited by examiner

MANIPULATING VISUAL REPRESENTATIONS OF DATA

BACKGROUND

The present disclosure relates to user interfaces and data visualization.

There exists a wide variety of data, e.g., text, raster images, vector images, and combinations thereof, that can be displayed on various display devices. Computer applications are widely used to display and manipulate such data. Commonly, these data can be referred to as documents that include content of different kinds A user of a computer system can access content of documents that are stored locally or remotely. Computer systems generally provide a graphical user interface (GUI) that provides windows of the kind that allow applications to display content in a display pane. Tools that allow the user of a computer to move comfortably through the text of an electronic document or an image display are important and are included in various forms in GUI applications.

Viewing specific content becomes more challenging with increasing amounts of document content. For example, large text documents require frequent scrolling in order to move to parts of the document that are hidden from the current view. As a result, with large documents, a user has to adjust display parameters of the document and/or the display parameters of a corresponding application window in order to move to different sections of the document. This is necessary because the scale at which a document can be displayed in the user interface in its entirety is usually very different from the scale that facilitates useful interaction with the document contents. The process of moving document contents in an application window is typically referred to as "scrolling." The presentation of the document may be linear, i.e., the user accesses document contents in an essentially sequential order from the beginning to the end of the document. Alternatively, the presentation of the document may also be non-linear, as for example often seen with hyperlinked documents (e.g., common web pages) that link certain parts of the document to certain parts of the same or other documents and that enable the user to quickly access and jump back and forth between certain parts of the document.

Common scrolling techniques include scrolling line by line or page by page in a document (or at discrete intervals in documents, such as vector graphics documents, that do not feature inherent elements like a line raster or a pixel raster), for example, performed in response to a key stroke or the use of a scroll wheel of a pointing device such as a mouse. Alternatively, scrolling can be performed in response to a combination of inputs, for example, clicking a button of a pointing device and moving the pointing device, dragging the document along. Specific user interface elements, e.g., scroll bars, can also be used to perform scrolling. A scrollbar can be used by pointing and clicking the pointing device, in connection with or without movement of the pointing device. In connection with scrolling content, and also known from other GUI elements, a function commonly referred to as "autoscroll" serves to scroll the document into the direction indicated by the position of the mouse cursor.

SUMMARY

This specification describes technologies relating to manipulating visual representations of data. In general, one aspect of the subject matter described in this specification can be embodied in methods that include the actions of displaying a first visual representation of a document, the first visual representation having one or more representation parameters including a zoom parameter having a first value; receiving a first input while maintaining a first position of a cursor relative to the first visual representation; modifying the zoom parameter to have a second value in response to the first input, where the visual representation of the document is adjusted according to the second value of the zoom parameter to provide a second visual representation; identifying a change in position of the cursor to a second position relative to the second visual representation; receiving a second input to modify the zoom parameter of the second visual representation; and modifying the zoom parameter to have a third value, where the second visual representation of the document is adjusted relative to the second position of the cursor according to the third value of the zoom parameter to provide a third visual representation of the document. Other embodiments of this aspect include corresponding systems, apparatus, and computer program products.

These and other embodiments can optionally include one or more of the following features. The method further includes displaying a visual guide in the second visual representation, the visual guide identifying the first visual representation relative to the second visual representation. The method further includes moving the visual guide in response to identifying change in position of the cursor. The method further includes receiving an input to modify a size of the visual guide to provide a modified visual guide and using the modified visual guide to determine the third value of the zoom parameter.

Modifying the zoom parameter to have a second value further includes determining a first target zoom level for zooming out. Modifying the zoom parameter to have a third value further includes determining a second target zoom level for zooming in. Receiving a first input includes receiving an input to an input device and determining whether a threshold time has elapsed without an additional input to the input device. The method further includes automatically scrolling the second visual representation when the position of the cursor moves to specific areas or across specific areas in the user interface.

Particular embodiments of the subject matter described in this specification can be implemented to realize one or more of the following advantages. When viewing documents, users often access different parts of the document. Users can view different parts of a document in a quick and easy manner by providing a quick and intuitive way of presenting document contents at different levels of detail. The level of detail associated with one specific scale (or specific scale range) allows for viewing of document contents. The level of detail associated with another specific scale (or specific scale range) allows for presenting a quick overview and repositioning of the view of the document in order to view a different portion of the documents and the corresponding contents. Thus, a user can quickly transition from one level of detail to the other level of detail. In particular, only simple and intuitive user interaction is necessary for changing between the two specific zoom ranges (or scale ranges).

Furthermore, the techniques disclosed can be integrated into already existing tools. The method can be easily integrated with, for example, a "grabber hand" tool, which is a common tool used in a number of applications. The techniques can be integrated with other tools as well, e.g., "drag and drop" tools or "pointer" tools that are integrated in a user interface of an operating system or application. The techniques can also be integrated into tools that operate across multiple applications or platforms.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

FIG. 1D is a screenshot showing the example user interface displaying the document and visual guides after zooming in.

Like reference numbers and designations in the various drawings indicate like elements.

DETAILED DESCRIPTION

Figure 1A:
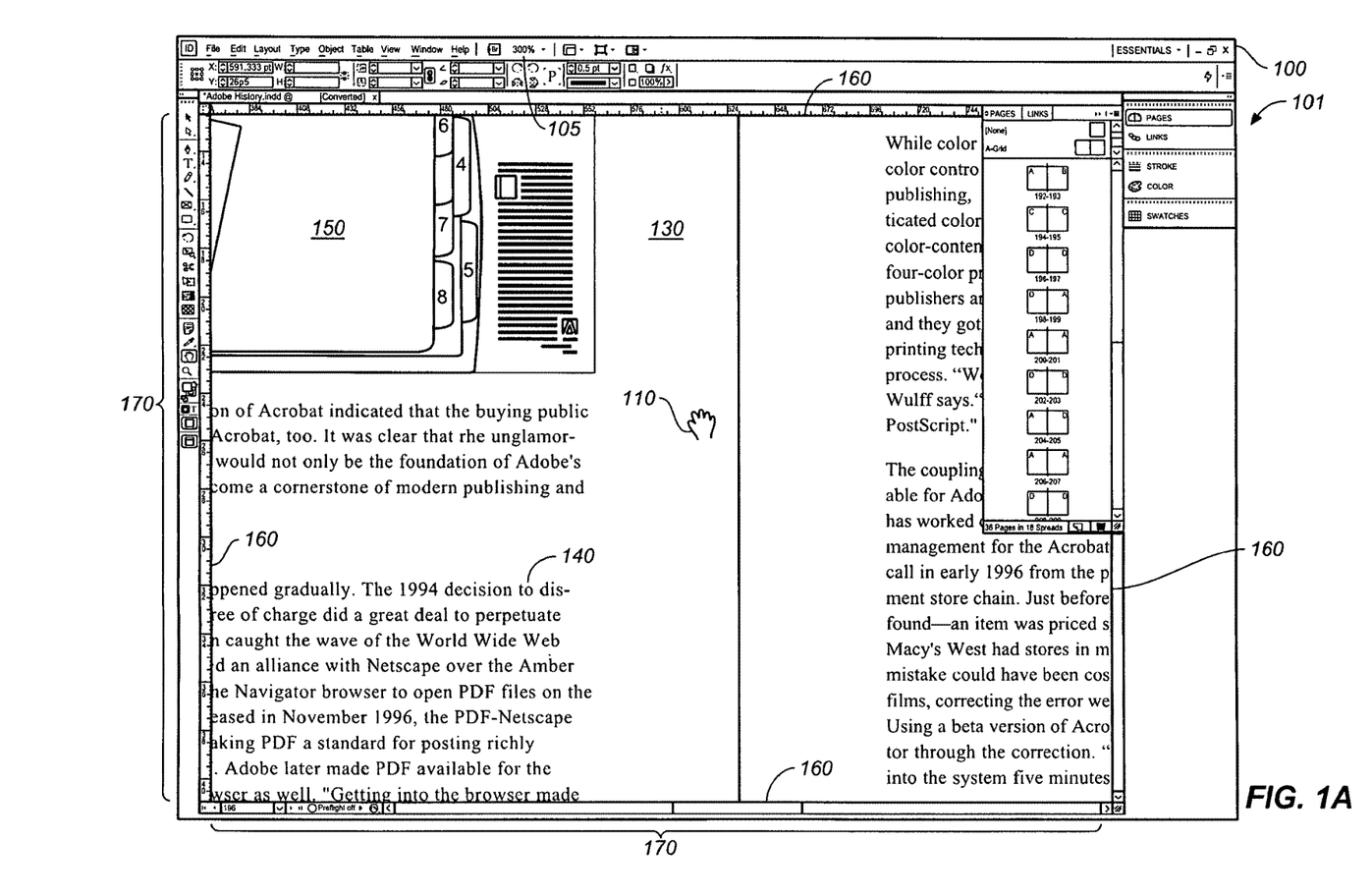
FIG. 1A is a screenshot showing an example user interface displaying an initial view of a document.

FIG. 1A is a screenshot 101 showing an example user interface displaying an initial view of a document 130 within an application window 100. The display also shows a cursor 110 (e.g., corresponding to input received from a mouse or other input device). In particular, the cursor 110 is shown having a form of a hand-shaped icon indicating a specific operating mode (e.g., a "grabber hand"). The application window 100 can include a number of elements, e.g., a title bar, menus, and toolbars including one or more control buttons. The operating mode as well as the particular menus and toolbar elements can vary depending on the particular application presented in application window 100.

The contents of the document 130 (e.g., document text 140 and document images 150) are only partially displayed due to a size of the document 130 and a scale at which the document is displayed. The particular scale can be selected in order to provide a particular level of magnification to the user in order to perform one or more operations relative to the document 130. In particular, the document 130 is shown at a scale representing a zoomed-in level such that text and other contents of the document 130 are displayed at a high level of detail (e.g., the document text 140 and images 150 are clear). For example, FIG. 1A illustrates the document 130 at a scale 105 having a zoom value of 300%, which represents a scaling factor of three over a defined size of the document contents (e.g., points or pica for textual content, or centimeters, inches for other content). However, a small portion of the document 130 is visible in the application window 100.

Figure 1B:
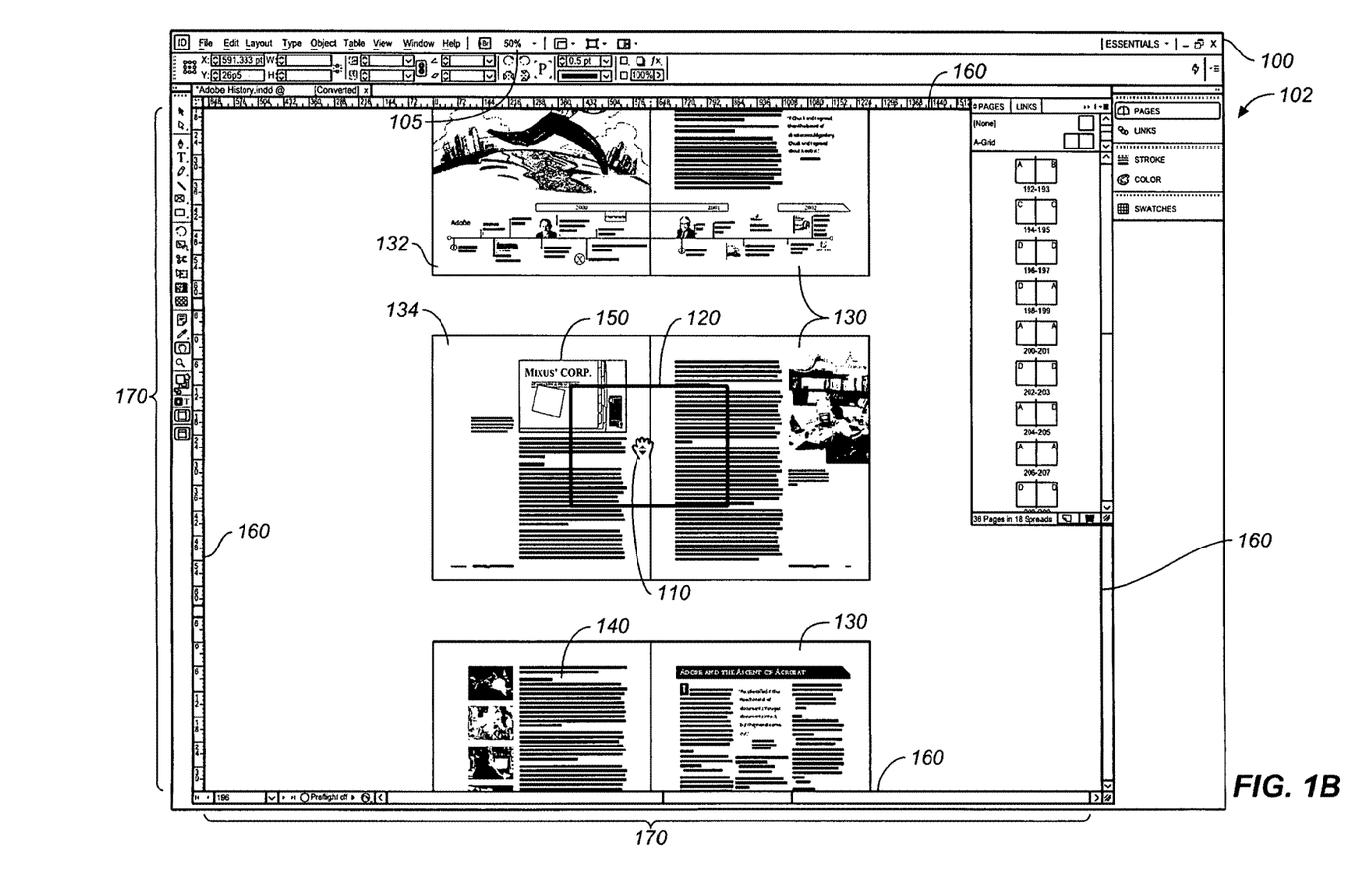
FIG. 1B is a screenshot showing the example user interface displaying the document and visual guides after zooming out.

FIG. 1B is a screenshot 102 showing the example user interface displaying the document 130 within the application window 100 after zooming out. Additionally, visual guides 120 are displayed within the application window 100. The visual guides 120 provide a frame that indicates the size and location of the previously displayed portion of the document 130 (e.g., the region bounded by the visual guides 120 represents the portion of the document displayed in the user interface when scaled to the level shown in FIG. 1A). One or more properties (e.g., form, shape, size, color, line style or weight, fill, and opacity) of the visual guides 120 can be adjustable. In some alternative implementations, visual guides are not displayed.

FIG. 1B illustrates a visual representation displaying a greater portion of the document 130 relative to the portion of the document 130 displayed in FIG. 1A according to their relative scales. In particular, FIG. 1B illustrates the document 130 at a scale 105 having a zoom value of substantially 50% representing a zoomed-out level at a scaling factor of 0.5 over a defined size of the document contents. In particular, the scale illustrated in FIG. 1B facilitates the display of a larger portion of the document 130 at a reduced level of detail—e.g., the document text 140 as shown in FIG. 1B is not rendered in enough detail due to the scaling, for a user to read the document text 140 However, FIG. 1B also illustrates an increased overall view of the document 130 and its contents, e.g., document text 140 and document images 150.

Figure 1C:
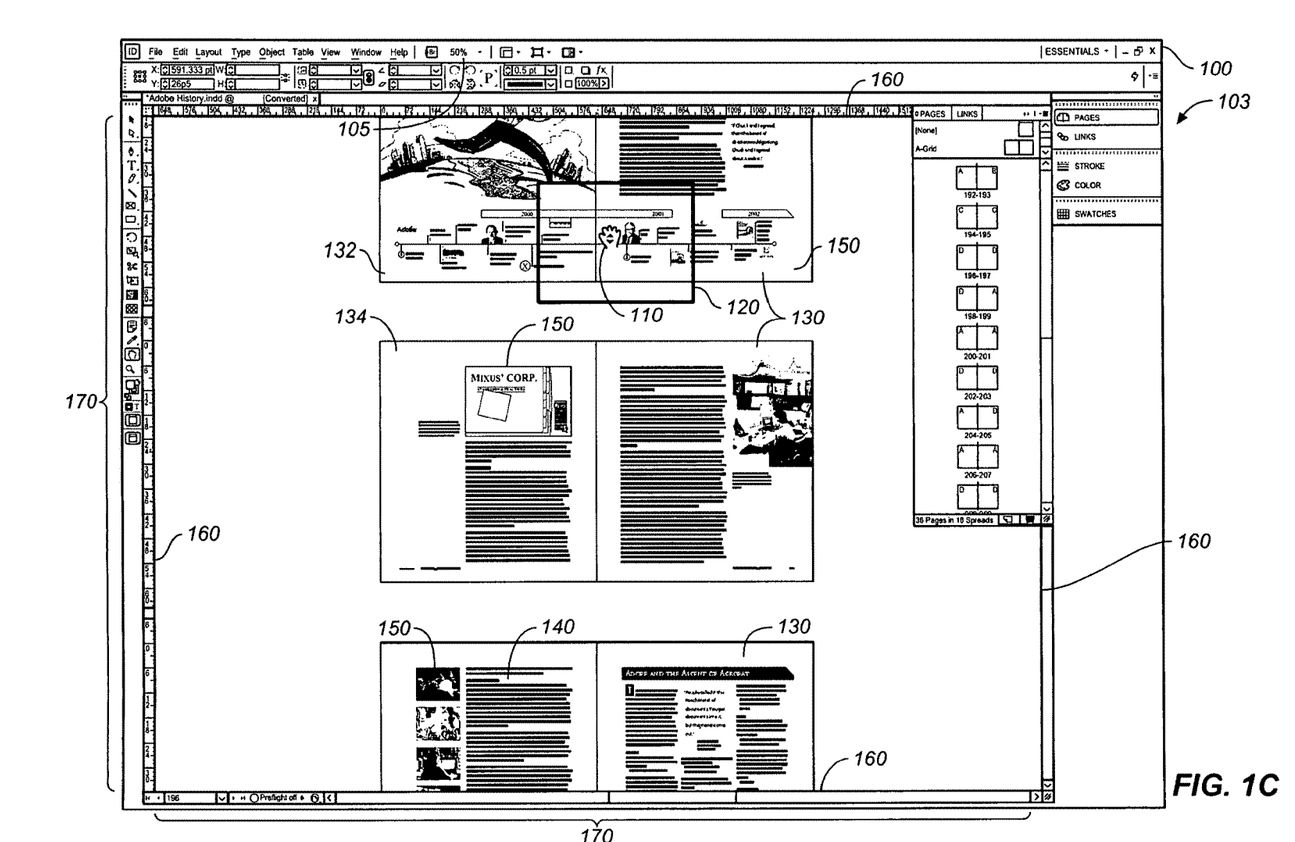
FIG. 1C is a screenshot showing the example user interface displaying the document and the visual guides while scrolling.

FIG. 1C is a screenshot 103 showing the example user interface displaying the document 130 and visual guides 120 within the application window 100 after moving the visual guides 120. The visual guides 120 have been moved, e.g., using the cursor 110, to a different location within the document 130. In relation to a center portion of two overleaf pages 134 shown in FIG. 1B, the visual guides 120 have been moved to the previous overleaf pages 132. The visual guides 120 indicate the portion of the document 130 that will be displayed after changing the scale to a zooming in level again. The greater portion of the document 130 presented by scaling to a zoomed out level enables the user to position the cursor 110 (and, therefore, the visual guides) to another location within the document 130. The user can position the visual guides 120 to any location within the document 130. Additionally, the visual guides 120 can be positioned at locations within the document 130 that are not shown (referred to as hidden portions of the document) within the displayed portion of the document 130. Positioning the visual guides to hidden areas is described below in FIG. 2.

Figure 1D:
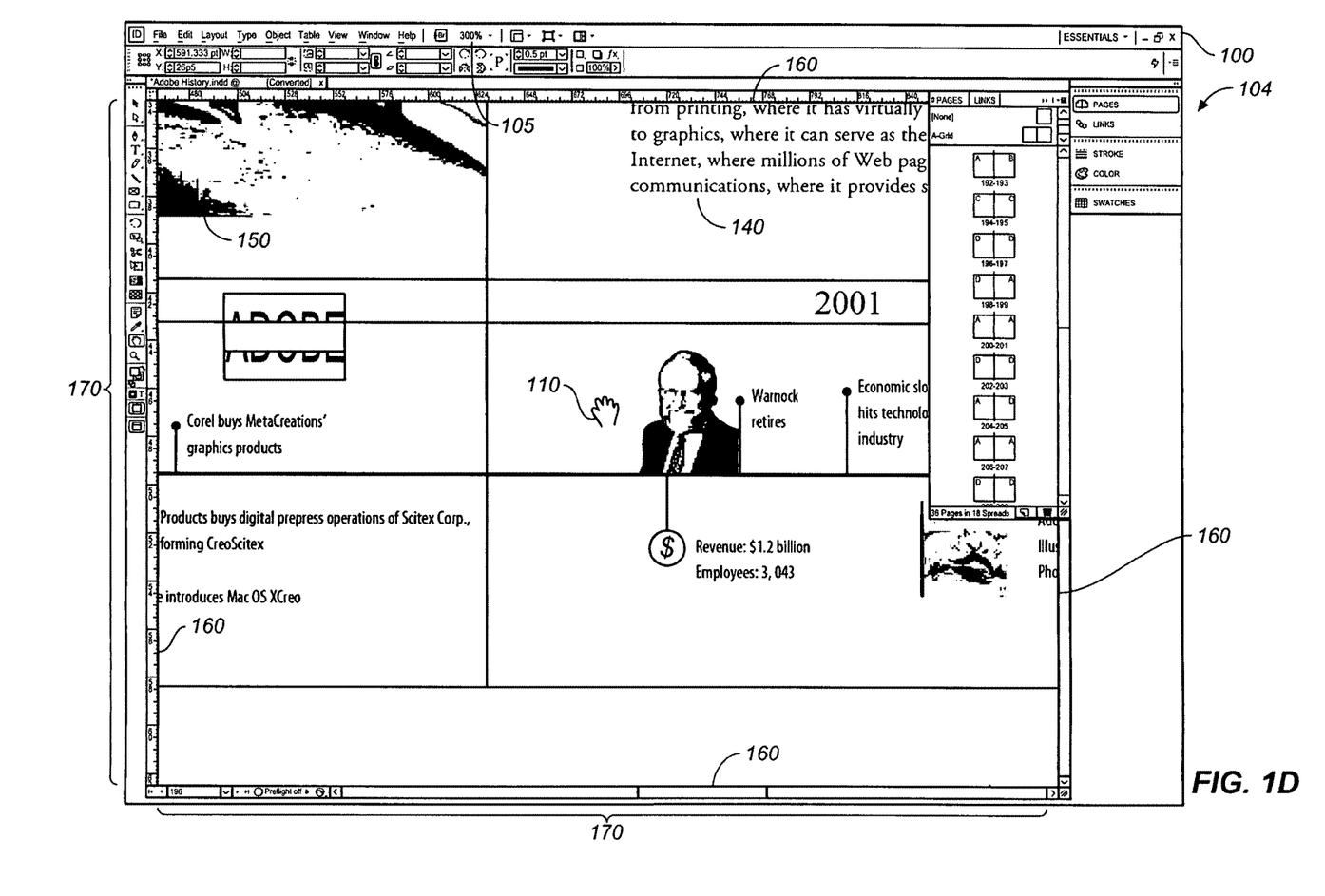

FIG. 1D is a screenshot 104 showing the example user interface displaying the document 130 within the application window 100 after zooming in at the location within the document 130 identified by the visual guides 120 in FIG. 1C. In FIG. 1D, similar to FIG. 1A, the document 130 is, once again, shown at a scale representing a zoomed-in level such that text and other contents of the document 130 are displayed at a high level of detail (e.g., the document text 140 and images 150 are clear). The portion of the document 130 on display within the display pane 170 corresponds to the area indicated by the visual guides 120 in FIG. 1C before zooming in. In some implementations, a target zoom level, i.e., the size of the portion of the document to be displayed after zooming in, is adjusted according to additional input, for example, as described below in FIG. 2.

Figure 2:
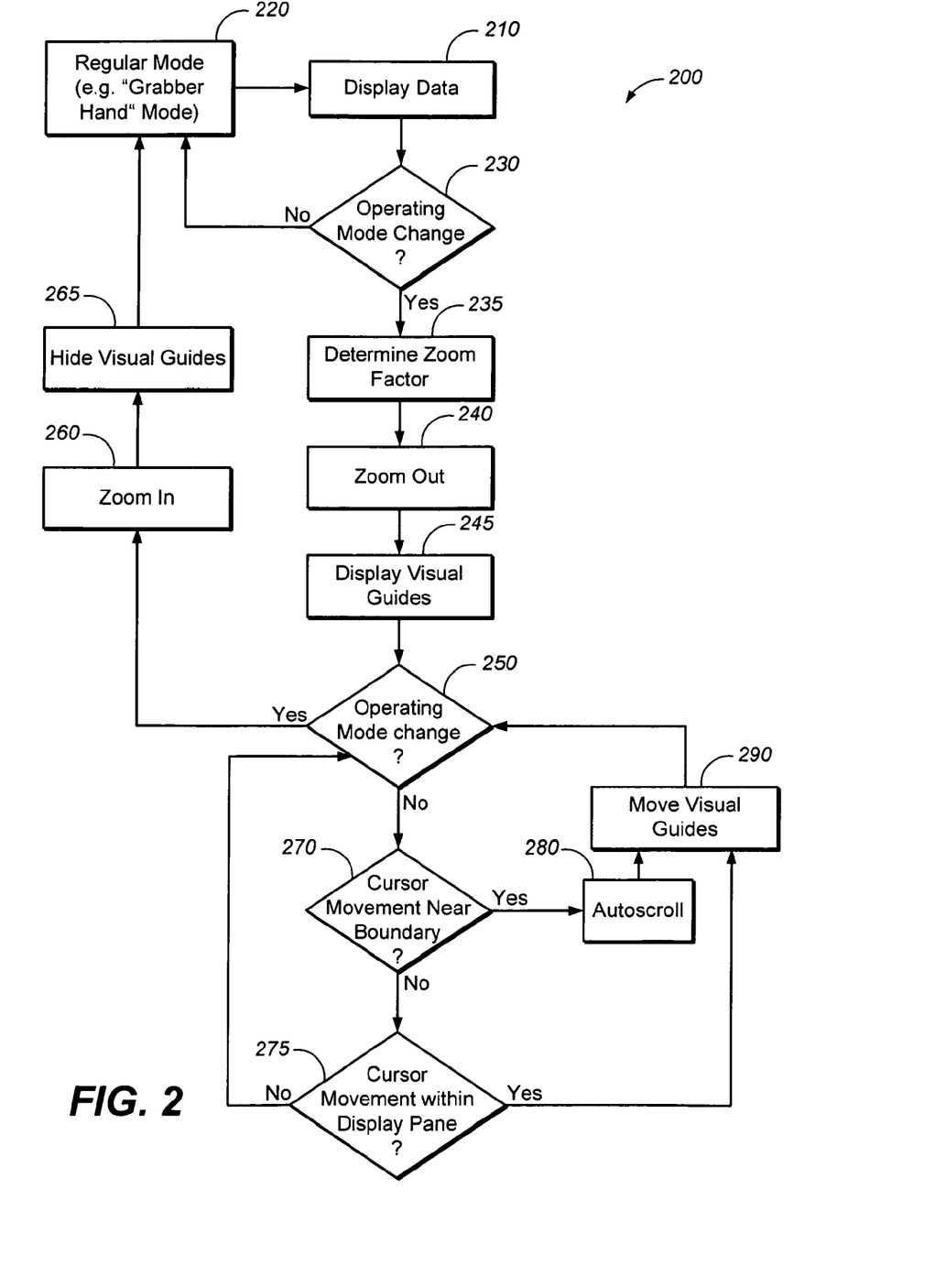
FIG. 2 is a flow chart showing an example process for performing zooming and scrolling.

FIG. 2 shows a flow chart of an example process 200 for manipulating a visual representation of a document. For convenience, the process 200 will be described with respect to a system that performs the process 200.

The system displays 210 document data. The document can be, for example, portable document format (PDF) files, word processor files, spread sheet files, raster image files, vector image files, and files including a combination of different data. An example document 130 containing document text 140 and document images 150 is shown in FIGS. 1A to 1D. For convenience, a document as used in this specification refers to any displayed data including not only documents such as word processing documents but also includes visual representations of data such as visual representation of audio data (e.g., an audio waveform) and video data (e.g., as represented by a series of discrete screenshots).

The document can be displayed as part of a particular application (e.g., a word processing application, a desktop publishing application, or a web authoring application). The display of the document includes a visual representation of some or all of the document contents. The contents can include, for example, text and images. Displaying the document includes providing the visual representation of the document contents at a specified scale (e.g., a zoom level). The scale level determines an amount of the document that is displayed in the visual representation. For example, a scale representing a zoomed-in level can present a smaller portion of the document within the visual representation while a scale representing a zoomed-out level that can present a larger portion of the document within the visual representation.

The value of the scaling can be specified, e.g., as a relation in size between document contents as represented on a display and the same document contents as represented on a printout. For example, in a word processing application, a scale of 100% (or 1:1) indicates that document contents are displayed at the same scale as a defined size of the document contents (e.g., points, pica, inches, centimeters). A scale greater than 1.0 or 100% (e.g., 200% or 2:1) indicates magnification, i.e., zooming in. Similarly, a scale less than 1.0 or 100% (e.g., 50% or 1:2) indicates reduction, i.e., zooming out. Different scale amounts can allow a user to perform different document manipulations while reducing the efficiency or ability to perform other operations. For example, larger scales can allow a user to read and edit document contents while limiting the user's ability to navigate (scroll) to different portions of the document. Similarly, smaller scales facilitate navigation between different portions of a document while making editing or reading of document content difficult or impossible.

The system receives 230 an input from an input device (e.g., a mouse or other input device for manipulating the cursor position) associated with changing the scale of the presented document. For example, the user can initiate a change in scale by clicking and holding a left mouse button in a particular operating mode (e.g., in the mode "grabber hand") without changing the position of the cursor (e.g., without moving the mouse).

The system determines 230 whether an additional input is received to move the cursor within a specified time period. The time period is specified such that the system determines whether the input is to change the operating mode or to manipulate the document in the current operating mode (e.g., to use the grabber hand to modify the position of the displayed portion of the document 130).

In some implementations, the specified time is substantially 0.5 seconds or one second. Furthermore, the specified time can be adjusted by the user to accommodate for shorter or longer time periods. Additionally, the user can toggle the method on and off depending, e.g., on a specific workflow.

If the system receives an input to move the cursor within the specified time period, the system does not change to current operating mode, but instead provides 220 the functionality associated with the current operating more (e.g., to use the grabber hand to modify the position of the displayed portion of the document 130). If the system does not receive an input within the specified time period (e.g., a timer expires without a movement input), the cursor (e.g., cursor 110) is altered to indicate a changed operating mode (e.g., "zooming grabber hand" mode).

When the operating mode is changed, the system determines 235 a zoom factor and automatically adjusts 240 the view of the document to correspond to the determined zoom level so as to encompass a larger portion of the document. Additionally, the system optionally displays 245 visual guides (e.g., visual guides 120 of FIG. 1B). In some implementations, the mouse cursor 110 is not altered when the operating mode is changed. When the system receives 250 an input indicating a change back to the previous (or another) operating mode, the previous (or another) zoom level is restored 260 and the visual guides (e.g. visual guides 120) are no longer displayed 265. The system then continues displaying 210 document data. FIGS. 1A and 1B illustrate an example of transitioning from a first zoom level to a second zoom level.

As shown in FIGS. 1A and 1B document 130 is modified from a first zoom level as shown in FIG. 1A to a second zoom level as shown in FIG. 1B in response to a user input to change operating mode. At the zoom level illustrated in FIG. 1B, a greater portion of the document 130 is visible within the user interface. The visual guides 120 are presented to illustrate the region of the document 130 visible at the zoom level shown in FIG. 1A. The user can use the zoomed out view level of the document 130 to identify other portions of the document 130.

As shown in FIG. 2, the system determines 270 whether a received input (e.g., a user input with the mouse) indicating cursor movement near or beyond a boundary of the display pane 170. When the cursor movement is not beyond the boundary, the system moves 290 the visual guides in response 275 to the received input to a corresponding location within the document. The visual guides are positioned relative to the location of the mouse cursor 110. The cursor can be positioned, e.g., at the center of the visual guides. For example, the location of the visual guides can correspond to the movement of the cursor in response to user input (e.g., to the user's mouse device). In some implementations, system displays the visual guides continuously indicating the position and the size of the portion of the document that will be displayed when the previous zoom level is restored. An example of moving the visual guides is shown in FIGS. 1B and 1C.

As shown in FIGS. 1B and 1C, the visual guides 120 are moved from a first position relative to the document 130 to a second position relative to the document 130. In the example depicted in FIG. 1C, the visual guides 120 were moved from the previously displayed portion of two overleaf pages 134 shown in FIG. 1B to a lower part of the previous two overleaf pages 132. The visual guides 120 indicate the position and the size of the portion of the document 130 that will be displayed in the display pane 170 when the previous zoom level is restored. While a vertical movement of the visual guides 120 is shown, movement can be in other directions relative to the document 130.

In some implementations, the user can move the visual guides 120 to a location at an edge of the displayed portion of the document in the display pane 170. The system can automatically scroll the document 130 in order to display additional portions of the document 130. This automatic scrolling is described in greater detail below.

As shown in FIG. 2, the system receives 250 an input (e.g., from the user) indicating a change to a different operating mode. For example, the user can release a button (e.g., on the mouse or a pressed key). The system, in response to the received input, changes 260 the zoom level (e.g., zooms in on the document) and hides 265 the visual guides, resulting in a display 210 of the document. Additionally, the previous operating mode can be restored (e.g., "grabber hand" mode). The user can again indicate a change in operation mode to modify the zoom level of the displayed document as described above.

As shown in FIG. 1D, the document 130 is shown at the same zoom level as in FIG. 1A. For example, the user can indicate a change in the operating mode from that shown in FIG. 1C. However, the portion of the document 130 shown in the display pane 170 is different. Specifically, the portion of the document 130 shown in the display pane 170 in FIG. 1D corresponds to the region of the document 130 identified by the position of the visual guides 120 in FIG. 1C. As shown in FIG. 2, when the system determines 270 that the received input is near or beyond a boundary of the displayed document, the system autoscrolls 280 the document contents.

For example, if the portion of the document that the user is scrolling to is not visible in the display pane of the application window at the current zoom level, autoscroll can be performed by the system. If the system receives user input indicating movement of the mouse cursor towards and/or over a boundary of the display pane in direction of the portion of the document to be displayed, autoscroll is performed. The system then performs autoscroll, unless an end of the document is reached, or unless the user performs a movement of the mouse cursor away from the boundary towards the display pane.

In some implementations, the system accepts other input (e.g., keystrokes) that indicates that scrolling of the document is intended or necessary. The autoscroll function, as known from other GUI elements, serves to scroll the view of the document into the direction indicated by the position of the mouse cursor. For example, as shown in FIG. 1B, the display pane 170 include a boundary 160. If a user moves the cursor, and therefore the visual guides, within a specified distance of the boundary 160, the autoscroll operation can be triggered. As a result, the underlying content of document 130 can scroll to modify the portion of the document 130 displayed in the display pane 170.

Sometimes, the direction of scrolling is perceived ambiguously. While the direction of scrolling is sometimes referred to as a document being scrolled into a desired direction, rather the view is scrolled into the desired direction and the document is actually scrolled into the opposite direction. The desired result is the view of the document being repositioned over another part of the document, and the result is the same regardless of the varied language used in describing the process.

In some implementations, while autoscroll is performed, the scrolling is performed with increasing speed according to a measure of time. The increase in speed facilitates quick scrolling to remote portions of large documents without the use of alternate modes of performing scrolling.

Adjusting the Visual Guides

In some implementations, the visual guides, are adjusted in response to a received input, e.g., a user input performed using the scroll wheel of the mouse or specific keys on a keyboard. For example, the visual guides can be increased or decreased in size or shape. As a consequence of the modified visual guides, the user adjusts the zoom level that was previously used before zooming out (i.e., the zoomed-in level) and before the system displayed the visual guides. Thus, the user can adjust not only the position of the portion of the document to be displayed after scrolling, but also the zoom level of the portion of the document.

This is particularly useful if the size of the previously displayed portion is smaller or larger than the portion of the document the user wants to scroll to. Thus, for example, a specific paragraph of text or a specific image in the document can be displayed at a corresponding zoom level before the zoom level is restored. Scrolling and adjusting the zoom level can be performed in one operation, e.g., by moving the mouse and activating the scroll wheel.

Determining an Operating Mode

Figure 3:
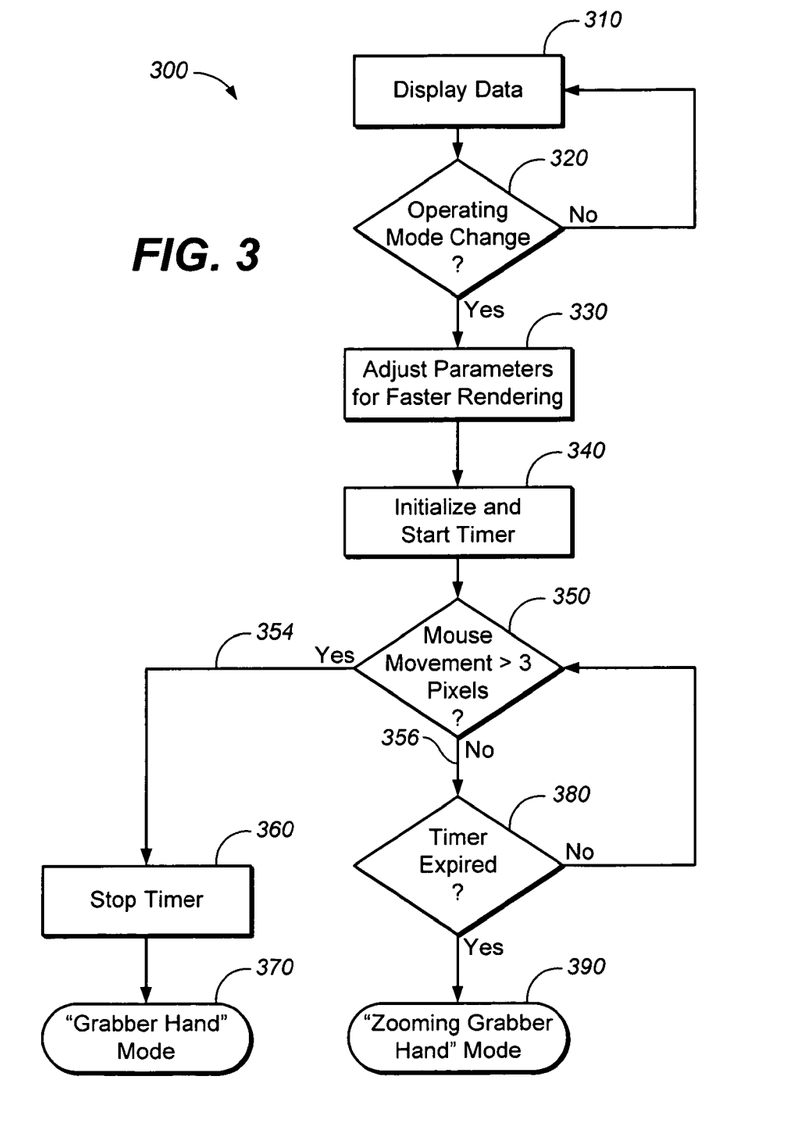
FIG. 3 is a flow chart showing an example process for determining an operating mode.

FIG. 3 is a flow chart showing an example process 300 for determining an operating mode. For example, the system can determine whether to activate a "zooming grabber hand" mode. For convenience, the process 300 will be described with respect to a system that performs the process 300.

While displaying 310 the document, before the system can zoom out according to a "zooming grabber hand" mode (e.g., steps 235, 240 in the process 200 of FIG. 2), the system determines the operating mode, e.g. "grabber hand" mode or "zooming grabber hand" mode. After the system receives 320 a corresponding user input (e.g., a mouse input), the system optionally adjusts 330 one or more rendering parameters for faster rendering. Documents can be, for example, large and complex (e.g., feature different kinds of content and hundreds or thousands of content items). Therefore, the system can render many different content items. In some implementations, rendering parameters are adjusted to facilitate sufficiently fast and smooth zooming. In some implementations, other methods for achieving a similar result are used, for example, the system can pre-render a representation of a target zoom level as a large bitmap and transfer the bitmap block by block to screen memory, e.g., by blitting.

The system initializes 340 a timer with a specified value (e.g., 0.5 seconds) and starts the timer. The timer can be implemented as a countdown timer, i.e., the time value is decremented from the initial value. However, the timer can be implemented in a number of other ways to achieve the same behavior. As long as the timer has not expired, the system tracks 350 user input (e.g., cumulative mouse movement). If the system detects 354 a specified amount of movement (e.g., greater than three pixels), the system stops 360 the timer and sets 370 the operating mode (e.g., to "grabber hand" mode). Consequently, no zooming out is performed but regular operation of the previous (and current) mode is performed. In the case of the mode being "grabber hand" mode, scrolling (or panning) of the document is performed as commonly known.

If the system receives no suitable user input 256 (e.g., no movement of the mouse or mouse movement within a specified threshold, for example, less than three pixels) while the timer is running (e.g., the timer is being decremented) and the timer expires 380 (e.g., the timer reaches zero), the system sets 390 the mode (e.g., to "zooming grabber hand" mode). Then, zooming out is performed as shown in FIG. 2 above.

Determining a Zoom Factor

Figure 4:
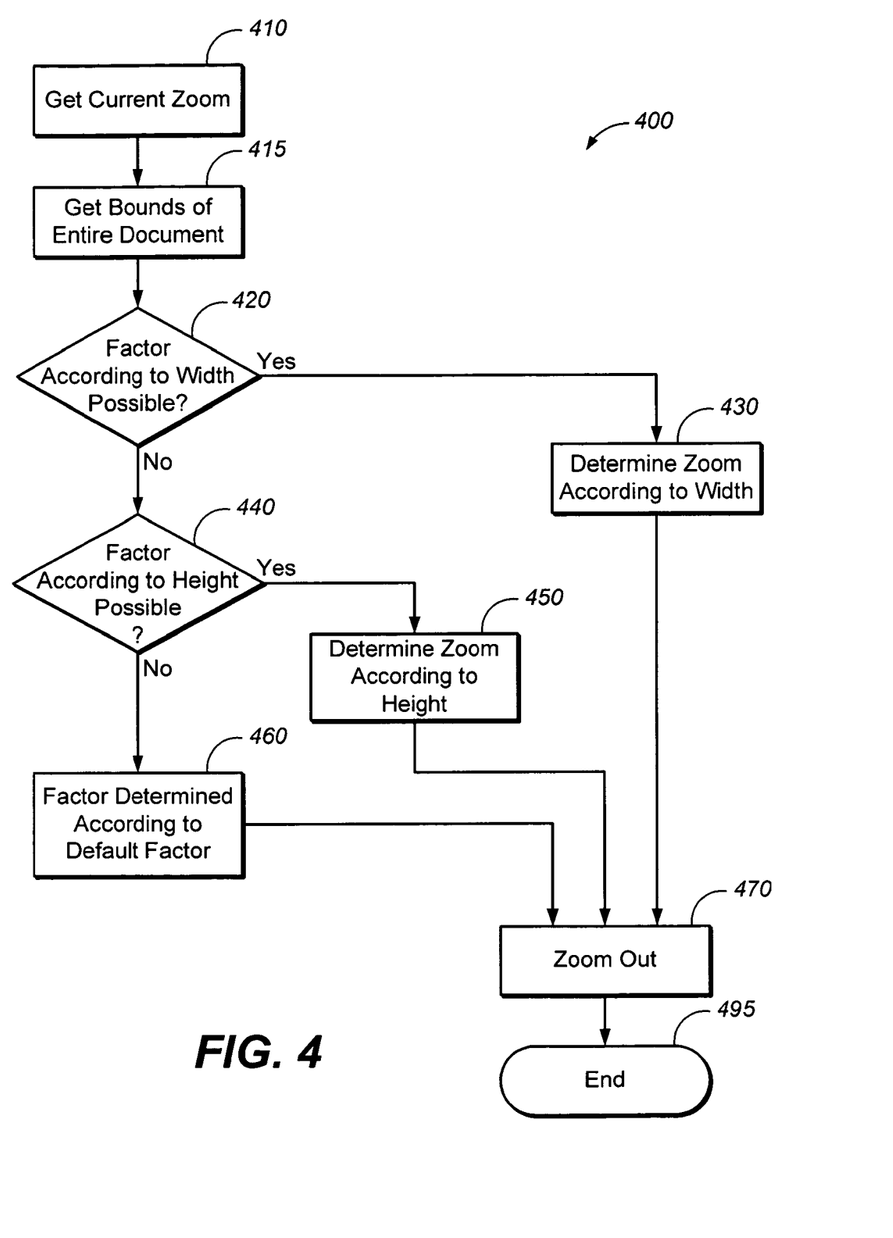
FIG. 4 is a flow chart showing an example process for determining a zoom factor.

FIG. 4 shows an example process 400 for determining a zoom factor. For convenience, the process 400 will be described with respect to a system that performs the process 400.

Before zooming out, the system determines a zoom factor for the document. The system determines 410 a current zoom level (e.g., the zoom level 105 of 300% as illustrated in FIG. 1A). The system determines 415 bounds of the document (e.g., the number of pages, page size and layout). In some implementations, the bounds of a document are determined according to all (visible and hidden) spreads of the document. A spread is a part of a document denoting the portion defined by one or more facing pages (e.g., the spreads of a magazine can usually include two facing pages; however, in some cases, a spread can have additional pages, for example, a foldout spread can include three or more pages). In some implementations, the bounds of the document are determined according to the width and the height of a pasteboard. The pasteboard includes, for example, one or more pages in a spread or one or more spreads and a surrounding space or work area (e.g., as shown by the spreads and background portion in FIG. 1B).

The system determines 420 whether the zoom factor can be determined according to a width of the document. A width of the document can be, for example, the width of a page, the width of a spread, or the width of a pasteboard. In some implementations, the width and height of the pasteboard is determined according to the width and height of all pasteboards (e.g., when each page has it own pasteboard), for example, by determining a rectangle that includes all pasteboards. In some implementations, the width and height are determined according to user input or user preferences. If the zoom factor cannot be determined according to the width of the document, then the system determines 440 whether the zoom factor can be determined according to document height. If the system determines 440 that the zoom factor can be determined according to the height of the document, the system determines 450 the zoom factor according to document height. If the zoom factor cannot be determined according to the height of the document, then the system determines 460 the zoom factor according to a default factor.

If the system determines 420 that the zoom factor can be calculated according to the width of the pasteboard, the system determines 430 the zoom factor according to the width of the pasteboard. In some implementations, the zoom factor is determined according to the width of the pasteboard as follows:

A zoom to the pasteboard width $z_{pasteboard}$, according to a view window width $w_{view\ window}$, a pasteboard width $w_{pasteboard}$ and an original zoom $z_{original}$, is determined using the following formula, where a specific minimum zoom value is used as a limit:

$$z_{pasteboard} = \left(\frac{w_{view\ window}}{w_{pasteboard}}\right) z_{original}.$$

Additionally, a fixed zoom $z_{fixed}$ is determined according to a maximum zoom $z_{max}$ and the original zoom $z_{original}$, using the following formula:

$$z_{fixed} = (z_{max})(z_{original}).$$

Then, an ideal zoom $z_{ideal}$ is determined according to the maximum of the zoom to the pasteboard width $z_{pasteboard}$ and the fixed zoom $z_{fixed}$:

$$z_{ideal} = \max(z_{pasteboard}, z_{fixed}).$$

Whether zooming according to the determined zoom factor $z_{ideal}$ is possible, is determined according to a maximum width zoom ratio $r_{mw}$, using to the following formula:

$$\left(\frac{z_{ideal}}{z_{original}}\right) < r_{mw}.$$

In some implementations, the maximum width zoom ratio $r_{mw}$ is substantially 0.7. This ratio can be used, e.g., to ensure that zooming is performed within specified limits.

If zooming based on the determined zoom factor $z_{ideal}$ is not possible, a zoom factor $z_{height}$ based on the height of the pasteboard is determined.

In some implementations, the system determines the zoom factor $z_{height}$ according to the height of the pasteboard, i.e. the constant height zoom ratio $r_{ch}$, and the original zoom $z_{original}$, using to the following formula:

$$z_{height} = (z_{original})(r_{ch}).$$

In some implementations, the constant height zoom ratio $r_{ch}$ is substantially 0.4.

If zooming based on the determined zoom factor $z_{height}$ is not possible, the system determines a default zoom factor according to a default small scale factor.

In some implementations, the system determines the default zoom factor $z_{default}$, according to the original zoom $z_{original}$ and the default small scale factor $s_s$, using to the following formula:

$$z_{default} = \left(\frac{z_{original}}{S_S}\right).$$

In some implementations, the default small scale factor $s_s$ is substantially 1.0. The default small scale factor $s_s$ can be, for example, 1.02, selected such that the visual guides just fit within the bounds of the zoomed-out display pane.

In some implementations, the user specifies one or more of the factors, constants, and ratios in order to accommodate specific zooming operations or requirements.

Zooming In and Zooming Out

Figure 5:
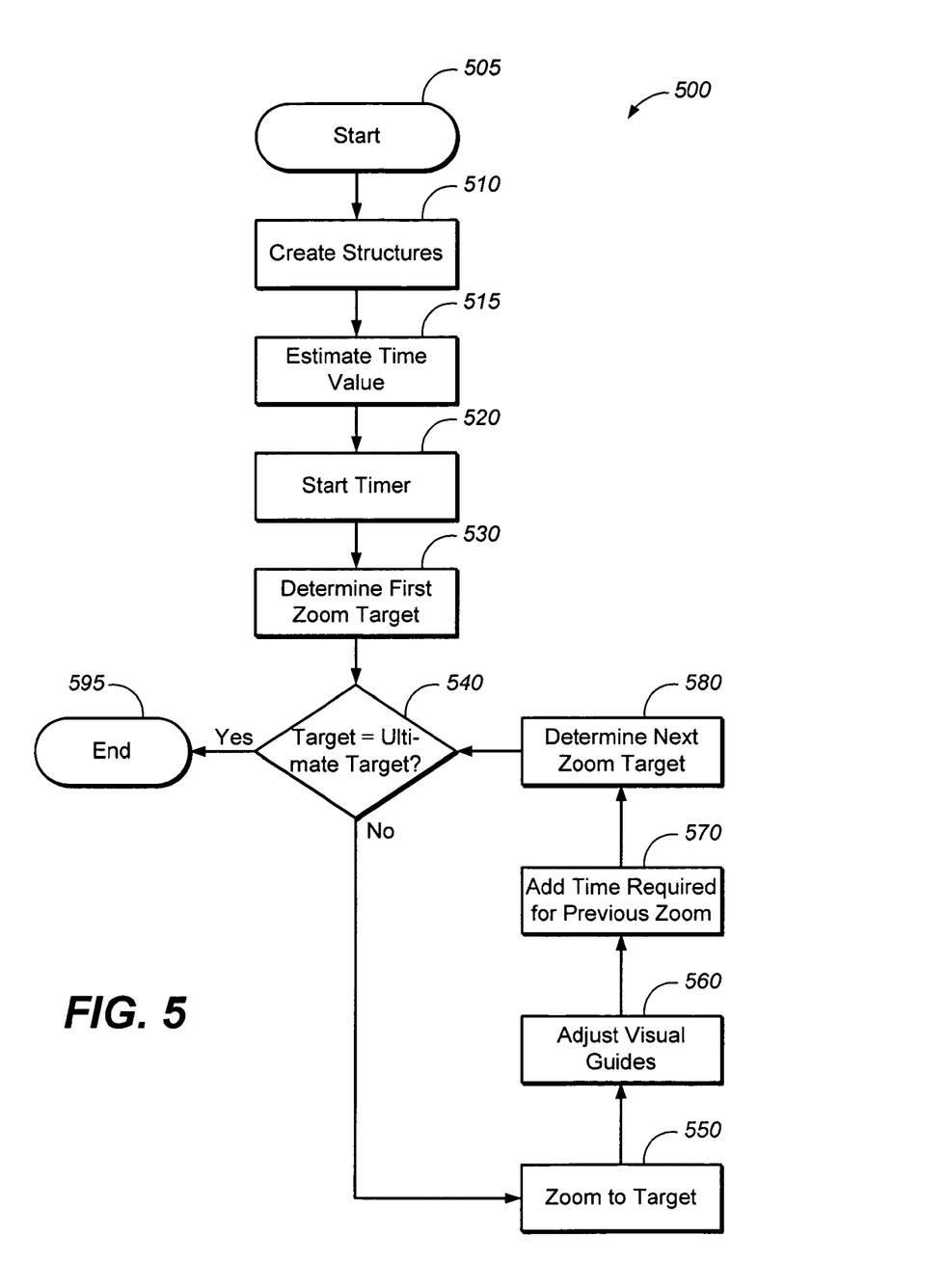
FIG. 5 is a flow chart showing an example process for performing zooming.

FIG. 5 shows an example process 500 for performing zooming. For convenience, the process 500 will be described with respect to a system that performs the process 500.

Zooming is performed, (e.g., in steps 240 and 265 of FIG. 2). As shown in FIG. 5, the system creates 510 the necessary structures for displaying the visual guides (e.g., a red rectangle sprite and associated data). The system estimates 515 a time value and initiates 520 a timer. The system determines 530 a first zoom target (i.e., zoom target level). When zooming in, the system determines 540 whether the zoom target is smaller than or equal to the final zoom target (i.e., the final zoom level) or whether the zoom target is the first zoom target that has been determined. If the zoom target is smaller than or equal to the final zoom target or if the zoom target is the first zoom target, the system adjusts 550 the current zoom to the determined zoom target.

Similarly, when zooming out, the system determines 540 whether the zoom target is greater than or equal to the final zoom target or whether the zoom target is the first zoom target that has been determined. If the zoom target is greater than or equal to the final zoom target or if the zoom target is the first zoom target, the system adjusts 550 the current zoom to the determined zoom target.

The system adjusts 560 the visual guides to the determined zoom target. The system stores 570 a time taken to zoom to the current zoom target according to a time difference determined based on the estimated time 515 and a measure of time that has expired since the timer was started 520. The next zoom target is determined by the system according to the time taken for the previous zoom 570 and the final zoom target. In some implementations, the zoom targets are determined by the system according to a function that maps time values to zoom values, whereas the mapping is a linear mapping. Other mapping functions can be used, e.g., including exponential or logarithmic functions.

Figure 6:
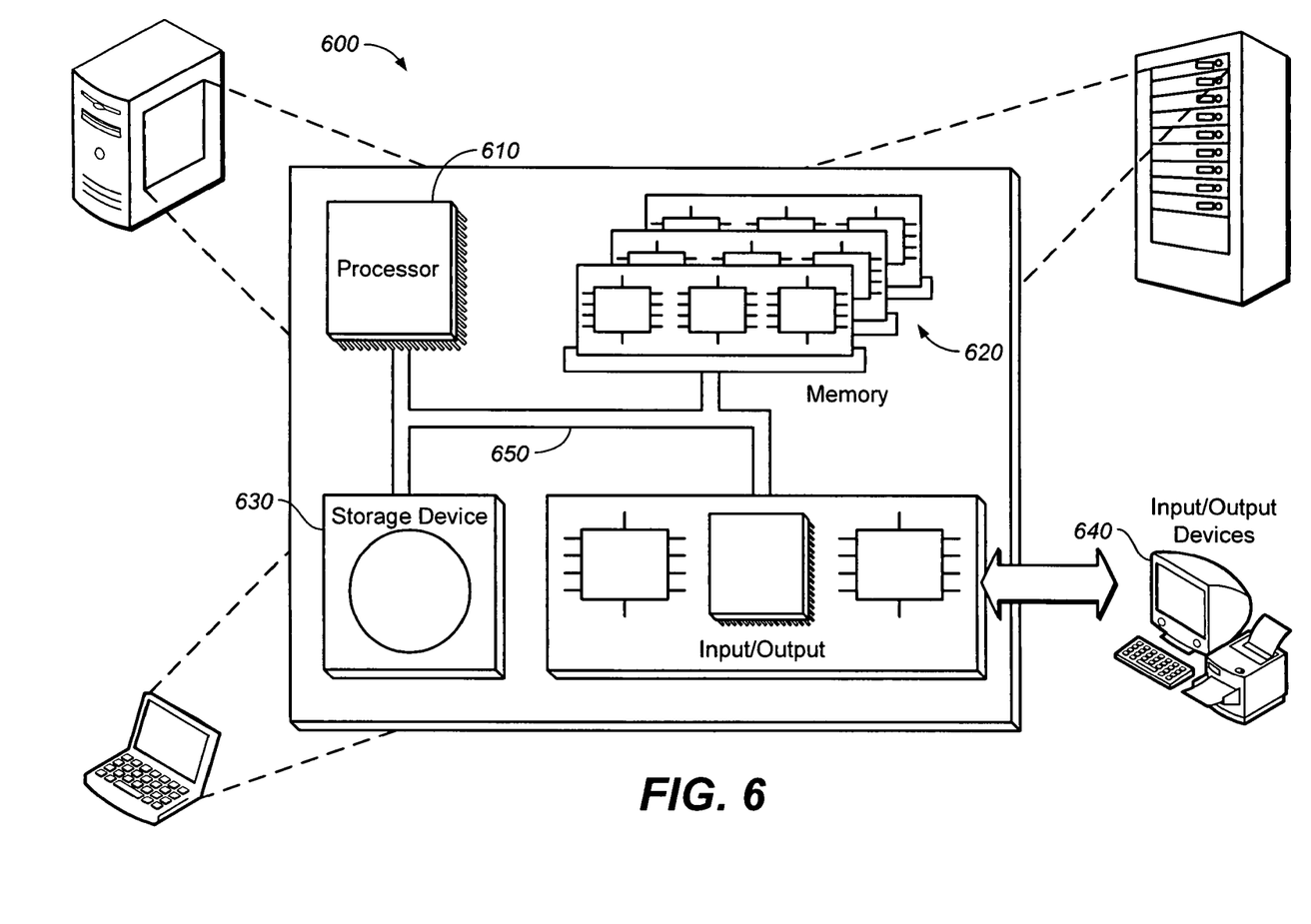
FIG. 6 is a schematic diagram of a generic computer system.

FIG. 6 is a schematic diagram of a generic computer system 600. The system 600 can be used for practicing operations described in association with, for example, the methods 200, 300, 400, and 500. The system 600 can include a processor 610, a memory 620, a storage device 630, and input/output devices 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi threaded processor. The processor 610 is capable of processing instructions stored in the memory 620 or on the storage device 630 to display graphical information for a user interface on the input/output device 640.

The memory 620 is a computer readable medium such as volatile or non volatile that stores information within the system 600. The memory 620 can store data structures, for example. The storage device 630 is capable of providing persistent storage for the system 600. The storage device 630 may be a floppy disk device, a hard disk device, an optical disk device, or a tape device, or other suitable persistent storage means. The input/output device 640 provides input/output operations for the system 600. In one implementation, the input/output device 640 includes a keyboard and/or pointing device. In another implementation, the input/output device 640 includes a display unit for displaying graphical user interfaces.

An electronic document (which for brevity will simply be referred to as a document) does not necessarily correspond to a file. A document may be stored in a portion of a file that holds other documents, in a single file dedicated to the document in question, or in multiple coordinated files.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method comprising:
    displaying, in a first operating mode, an initial view of a first portion of a document in an application window;
    in response to an input not being received within a predetermined time period, entering a second operating mode to display a first zoomed-out view of the document in the application window, wherein entering the second operating mode comprises displaying a visual guide to indicate the first portion of the document in the first zoomed-out view, the visual guide comprising a frame that indicates a size and location of the first portion of the document relative to the first zoomed-out view; and
    causing a second portion of the document that is not displayed in the first zoomed-out view to be displayed in the visual guide in response to an auto scroll operation triggered by the visual guide being placed to a boundary of a display pane of the application window.

2. The computer-implemented method of claim 1, further comprising: displaying a zoomed-in view of the second portion of the document identified by the visual guide in the zoomed-out view in response to a request to zoom in the second portion of the document; wherein the initial view and the zoomed-in view are associated with two different zoom levels.

3. The computer-implemented method of claim 2, wherein the request to zoom in the second portion of the document comprises modifying a size of the visual guide; wherein the zoomed-in view displays the second portion identified by the modified visual guide, and a size of the second portion is modified according to the size of the visual guide.

4. The computer-implemented method of claim 2, wherein a level of magnification of at least one of the initial view, the zoomed-out view, or the zoomed-in view is specified by a user.

5. The computer-implemented method of claim 1, further comprising:
    identifying a change in position of a cursor in the application window; and
    placing the visual guide to the location in relation to the change in position of the cursor.

6. The computer-implemented method of claim 1, wherein one or more properties of the visual guide are adjustable.

7. The computer-implemented method of claim 6, wherein the one or more properties of the visual guide comprises at least one of form, shape, size, color, line style, line weight, fill, or opacity.

8. The computer-implemented method of claim 1, further comprising:
    changing a size of the visual guide.

9. The computer-implemented method of claim 1, wherein the document is one of a portable document format (PDF) file, word processor file, spreadsheet file, raster image file, vector image file, or file including a combination of different data.

10. The computer-implemented method of claim 1, wherein a zoom level of the first zoomed-out view of the document is determined based on at least one measurement of bounds of the document.

11. The computer-implemented method of claim 1, wherein a zoom level of the first zoomed-out view the document is determined based on a width of the document.

12. A computer program product, encoded on a non-transitory computer-readable storage device, operable to cause data processing apparatus to perform operations comprising: causing display, in a first operating mode, an initial view of a first portion of a document in an application window; determining whether there is an input to an input device within a threshold time; in response to the threshold time being elapsed without receiving the input to the input device, entering a second operating mode, wherein the entering the second operating mode comprises causing display of a visual guide and a zoomed-out view of the document, wherein the visual guide comprising comprises a frame that indicates a size and location of the first portion of the document relative to the zoomed-out view; causing a second portion of the document that is not being displayed in the zoomed-out view to be displayed in the visual guide in response to an auto scroll operation triggered by the visual guide being placed within a predetermined distance to an edge of the zoomed-out view.

13. The computer program product of claim 12, further operable to perform operations comprising:
   modifying a size of the visual guide; and
   causing display of a zoomed-in view of the second portion of the document in response to a request to zoom in the document, wherein the zoomed-in view displays the second portion identified by the modified visual guide.

14. The computer program product of claim 13, further operable to perform operations comprising:
   in response to receiving another input to the input device within another threshold time, preventing the document from being zoomed-out in the application window.

15. The computer program product of claim 13, wherein the initial view and the zoomed-in view are in different zoom levels.

16. A system comprising: a processor and a memory operable to perform operations comprising: in a first operating mode, presenting, in a user interface, an initial view of a first portion of a document; in response to an input not being received within a predetermined time period, entering a second operating mode to update the user interface with a zoomed-out view of the document; rendering a visual guide on the user interface to encompass the first portion of the document in the zoomed-out view; moving, in the user interface, the visual guide to a second portion of the document in response to a change in position of a cursor in the user interface; and in response to a request to zoom in the second portion of the document causing display of a zoomed-in view of the second portion of the document identified by the visual guide in the zoomed-out view, wherein the request to zoom in the second portion of the document comprises modifying a size of the visual guide, wherein the zoomed-in view displays the second portion identified by the modified visual guide.

17. The system of claim 16, wherein the initial view and the zoomed-in view are in different zoom levels.

\* \* \* \* \*

UNITED STATES PATENT AND TRADEMARK OFFICE
CERTIFICATE OF CORRECTION

PATENT NO. : 10,353,533 B2
APPLICATION NO. : 14/974575
DATED : July 16, 2019
INVENTOR(S) : Freeman et al.

Page 1 of 1

It is certified that error appears in the above-identified patent and that said Letters Patent is hereby corrected as shown below:

In the Specification

In Column 1, Line 13, after "kinds" insert -- . --.

In the Claims

In Column 14, Line 6, Claim 1, delete "auto scroll" and insert -- auto-scroll --, therefor.

In Column 14, Lines 55-56, Claim 12, delete "non- transitory" and insert -- non-transitory --, therefor.

In Column 14, Line 66, Claim 12, after "guide" delete "comprising".

In Column 15, Line 4, Claim 12, delete "auto scroll" and insert -- auto-scroll --, therefor.

Signed and Sealed this
Fifth Day of May, 2020

Andrei Iancu
*Director of the United States Patent and Trademark Office*